(12) United States Patent
Dettinger et al.

(10) Patent No.: US 8,190,880 B2
(45) Date of Patent: May 29, 2012

(54) METHODS AND SYSTEMS FOR DISPLAYING STANDARDIZED DATA

(75) Inventors: Richard Dean Dettinger, Rochester, MN (US); Frederick Allyn Kulack, Rochester, MN (US); Shannon Everett Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1512 days.

(21) Appl. No.: 11/626,486

(22) Filed: Jan. 24, 2007

(65) Prior Publication Data

US 2008/0177703 A1 Jul. 24, 2008

(51) Int. Cl.
*H04L 29/06* (2006.01)

(52) U.S. Cl. ........ 713/154; 707/706; 707/713; 707/723; 707/748

(58) Field of Classification Search ................... 713/154; 707/706, 713, 723, 748

See application file for complete search history.

(56) References Cited

U.S. PATENT DOCUMENTS

2005/0203888 A1* 9/2005 Woosley et al. .................. 707/3

\* cited by examiner

*Primary Examiner* — Eleni Shiferaw
*Assistant Examiner* — Paul Callahan
(74) *Attorney, Agent, or Firm* — Patterson & Sheridan LLP

(57) ABSTRACT

Embodiments of the invention are generally related to data processing, and more specifically to processing data retrieved from a database. A GUI screen displaying query results may provide for the selection of a data standard to be applied to the query results. An analysis routine may identify specific results that comport with a selected data standard and visually identify the specific query results that comport with the selected data standard.

14 Claims, 8 Drawing Sheets

DATA ABSTRACTION MODEL ⟵ 148

Field A
   Name="First Name" ⟵ 310a
   AccessMethod="Simple" ⟵ 312a
   Table="Test_Table"
   Column="f_name"
⟵ 308

Field X
   Name="Test" ⟵ 310b
   AccessMethod="Filtered" ⟵ 312b
   Table="Test_Table"
   Column="Test_Val"
   Filter=min<Test_Val<max
   Value Standard=Field_Y ⟵ 320
   Date Standard=Field_Z ⟵ 321
⟵ 308

Field Y
   Name="Value_Standard"
   Table="Test_Table"
   Column="Y"
   Values=Gold → Criteria for Gold
          Silver → Criteria for Silver  } 310
          Null → Criteria for Null
⟵ 309

Field Z
   Name="Date_Standard"
   Table="Test_Table"
   Column="Z"
   Values=Gold if date > 2000
          Silver if 1990 ≤ Date ≤ 2000
          Null if Date < 1990
⟵ 309

*Fig. 3*

| PATIENT ID | LAST NAME | FIRST NAME | TEST 1 | HEMOGLOBIN TEST | AGE | DATE (YEAR) |
|---|---|---|---|---|---|---|
| 2 | PITT | TODD | 55 | 65 | 35 | 2001 |
| 12 | SMITH | JEREMY | 51 | 49 | 33 | 2002 |
| 48 | DENIRO | JULIET | 66 | 67 | 39 | 1995 |
| 65 | FORD | ANITA | 78 | 62 | 44 | 1999 |
| 26 | WOODRUFF | JACK | 54 | 56 | 37 | 2003 |
| 484 | VALETTA | TIFANY | 73 | 66 | 41 | 1998 |
| 874 | DELAROSA | HAROLD | 68 | 69 | 50 | 1996 |
| 6 | STEWART | BOB | 72 | 48 | 43 | 1997 |
| 64 | WRIGHT | JILL | 53 | 61 | 49 | 2005 |
| 54 | McNAMARA | ALLISON | 61 | 58 | 42 | 2006 |
| 65 | AGUILAR | JOSE | 59 | 55 | 40 | 1998 |

SELECT DATA STANDARD

701 —○ Date Standard       702 —○ Value Standard

703 —☐ Gold              706 —☐ Gold

704 —☐ Silver            707 —☐ Silver

705 —☐ None              708 —☐ None

| PATIENT ID | LAST NAME | FIRST NAME | TEST 1 | HEMOGLOBIN TEST | AGE | DATE (YEAR) |
|---|---|---|---|---|---|---|
| 2 | PITT | TODD | 55 | 65 | 35 | 2001 |
| 12 | SMITH | JEREMY | 51 | 49 | 33 | 2002 |
|  |  |  |  |  |  |  |
|  |  |  |  |  |  |  |
| 26 | WOODRUFF | JACK | 54 | 56 | 37 | 2003 |
|  |  |  |  |  |  |  |
|  |  |  |  |  |  |  |
|  |  |  |  |  |  |  |
| 64 | WRIGHT | JILL | 53 | 61 | 49 | 2005 |
| 54 | McNAMARA | ALLISON | 61 | 58 | 42 | 2006 |
|  |  |  |  |  |  |  |

SELECT DATA STANDARD

701 —⦿ Date Standard     702 —◯ Value Standard

703 —☑ Gold     706 —☐ Gold

704 —☐ Silver     707 —☐ Silver

705 —☐ None     708 —☐ None

METHODS AND SYSTEMS FOR DISPLAYING STANDARDIZED DATA

CROSS-REFERENCE TO RELATED APPLICATIONS

This application is related to U.S. patent application Ser. No. 11/626,459, entitled "Methods and Systems for Retrieving Query Results Based on a Data Standard Specification", filed herewith, by Dettinger, et al. This related patent application is herein incorporated by reference in its entirety.

BACKGROUND OF THE INVENTION

1. Field of the Invention

The present invention is generally related to data processing, and more specifically to processing data retrieved from a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as SQL, that lets programmers and programs select, insert, update, find the location of data, and so forth.

Any requesting entity, including applications, operating systems and, at the highest level, users, can issue queries against data in a database. Queries may be predefined (i.e., hard coded as part of an application) or may be generated in response to input (e.g., user input). Upon execution of a query against a database, a query result is returned to the requesting entity.

For example, a medical researcher may issue queries against a database to retrieve data to support research efforts. The data may include, for example, patient records that may be used to determine the pathology for particular disorders. Patient records may include, for example, a patients' demographic data, values for administered tests, testing conditions, patient response to tests, doctor's notes, and the like. Studying the data related to a particular disorder stored in a database may allow researchers to devise adequate measures to improve prevention, diagnosis, and management of the disorder.

One problem with retrieving data for medical research is that not all data retrieved by a query may be desirable. For example, a researcher may collect data for his research from a number of sources, for example, from one or more hospitals. If a hospital does not have reliable procedures for data collection, the data may be unreliable, and therefore undesirable for inclusion in the research. For example, a hospital may use outdated equipment for conducting tests on a patient, thereby making that hospital's data unreliable and undesirable for research purposes.

Any given database may also contain invalid data that can be returned in a given query result, such as negative age values. The invalid data can be introduced into a given database due to various reasons, such as typographical errors, architectural problems with data replication and timing, mistakes in original data acquisition, and the like. Because of the invalid data, the given query result can be useless to a corresponding requesting entity that wants to further process the query result. For instance, if the researcher wants to determine an average age of patients in a hospital for which a specific treatment is suitable and the query result includes negative age values, an incorrect average value is obtained. Accordingly, some level of data cleansing is needed to ensure data consistency, accuracy, and reliability in a given database.

However, in large databases data cleansing is an expensive and time-consuming process that may require a large amount of processor resources and an even larger amount of manpower. Accordingly, data cleansing is not automatically implemented and/or frequently performed in database environments and, as a result, corresponding databases may include undesirable or invalid data. Thus, a user needs to perform a manual clean operation on each query result obtained from such a database in order to identify invalid data included therewith prior to further processing of the query result. More specifically, the user needs to perform an exhaustive examination on any data returned from the database in order to verify whether the data is valid or to execute suitable database queries that are configured to identify whether the database includes the invalid data.

Accordingly, what is needed are methods, systems, and articles of manufacture for retrieving data based on a quality of the data.

SUMMARY OF THE INVENTION

The present invention is generally related to data processing, and more specifically to processing data retrieved from a database.

One embodiment of the invention provides a method for displaying query results. The method generally comprises receiving a selection of a data standard to be applied to a first set of query results, displayed in a Graphical User Interface (GUI) screen, the data standard being selected from at least two different data standards, wherein the data standard defines a desired quality of data with respect to at least one field included in the first set of query results. The method further includes determining, by an analysis routine, a second set of query results in response to receiving the selection of the data standard, the second set of query results being in accordance with the selected data standard, and wherein the second set of query results is a subset of the first set of query results, and identifying the second set of results of the query in the GUI screen.

Another embodiment of the invention provides a computer readable medium containing a program which, when executed, performs an operation, generally comprising receiving a selection of a data standard to be applied to a first set of query results, displayed in a Graphical User Interface (GUI) screen, the data standard being selected from at least two different data standards, wherein the data standard defines a desired quality of data with respect to at least one field included in the first set of query results. The operation further comprises determining, by an analysis routine, a second set of query results in response to receiving the selection of the data standard, the second set of query results being in accordance with the selected data standard, and wherein the second set of query results is a subset of the first set of query results, and identifying the second set of results of the query in the GUI screen.

Yet another embodiment of the invention provides a system generally comprising at least a memory and a processor. The system further comprises a data abstraction model providing a definition for each of a plurality of logical fields and a data standard definition for each of the logical fields, wherein the data standard definitions include at least two different data standard definitions defined on the basis of respective criteria, a run time component for generating, from an abstract query referencing at least one of the logical fields, a query consistent with a particular physical representation of data, and an analysis routine for determining a set of results of the query that are consistent with a selected data standard and identifying the respective set of results in a Graphical User Interface (GUI) displaying query results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates a data abstraction model according to an embodiment of the invention.

FIG. 7 illustrates an exemplary GUI screen for specifying a data standard, according to an embodiment of the invention.

FIG. 8 illustrates an exemplary GUI screen displaying query results that comport with a selected data standard, according to an embodiment of the invention.

DETAILED DESCRIPTION OF THE PREFERRED EMBODIMENTS

Figure 1:
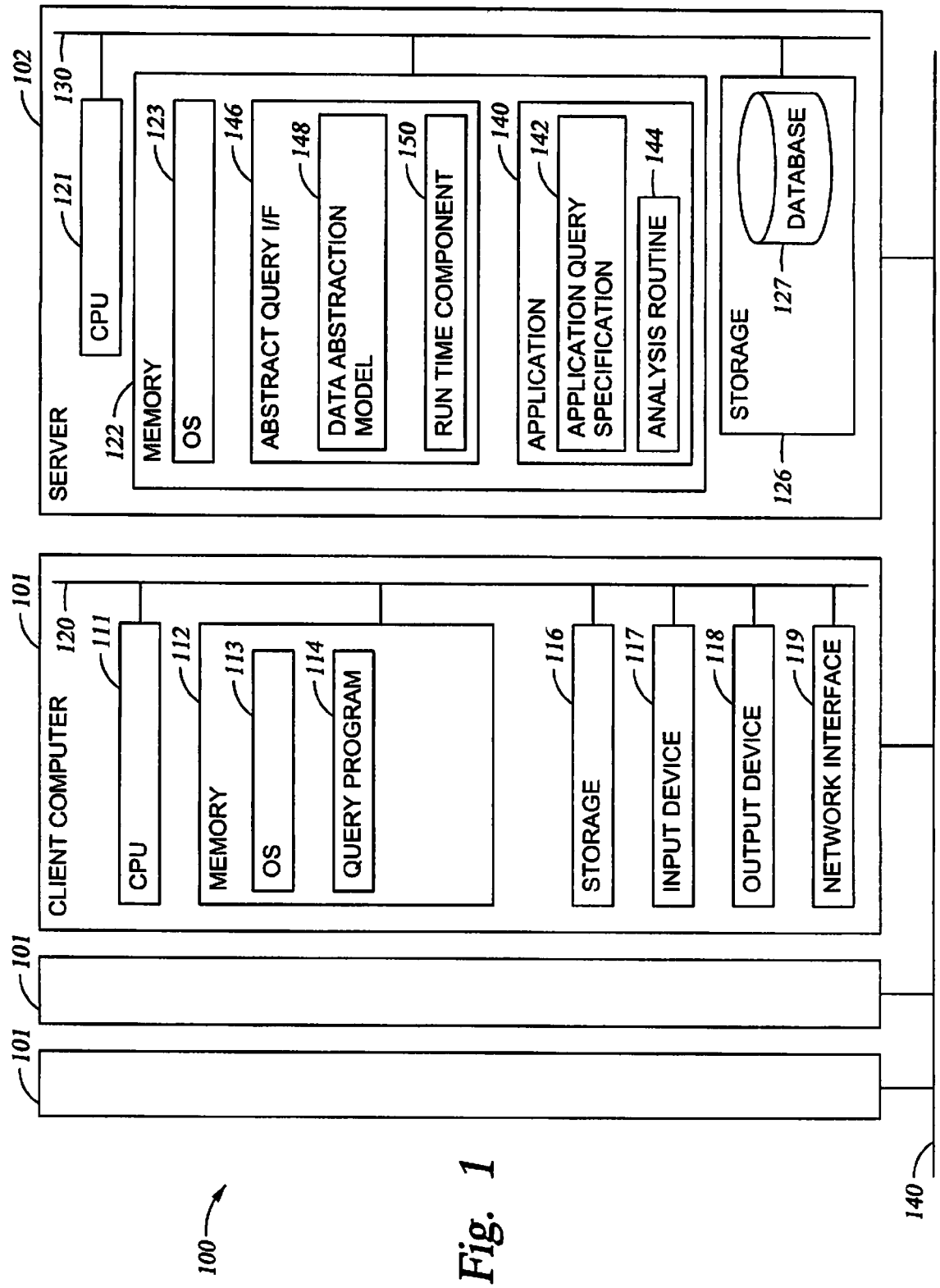
FIG. 1 illustrates an exemplary system according to an embodiment of the invention.

The present invention is generally related to data processing, and more specifically to processing data retrieved from a database. A GUI screen displaying query results may provide for the selection of a data standard to be applied to the query results. An analysis routine may identify specific results that comport with a selected data standard and visually identify the specific query results that comport with the selected data standard.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 depicts a block diagram of a networked system 100 in which embodiments of the invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, trackball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a query program 114 which, when executed by CPU 111, provides support for issuing queries to server 102. In one embodiment, the query program 114 may include a web-based Graphical User Interface (GUI), which allows the user to display Hyper Text Markup Language (HTML) information. The GUI may be configured to allow a user to create a query, issue the query against a server 102, and display the results of the query. More generally, however, the query program may be a GUI-based program capable of rendering any information transferred between the client computer 101 and the server 102.

The server 102 may by physically arranged in a manner similar to the client computer 101. Accordingly, the server 102 is shown generally comprising at least one CPU 121, memory 122, and a storage device 126, coupled with one another by a bus 130. Memory 122 may be a random access memory sufficiently large to hold the necessary programming and data structures that are located on server 102.

In one embodiment, server 102 may be a logically partitioned system, wherein each logical partition of the system is assigned one or more resources, for example, CPUs 121 and memory 122, available in server 102. Accordingly, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

The memory 122 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 121 in the server 102, the applications 140 and the abstract query interface 146 cause the computer system 100 to perform the steps necessary to execute steps or elements embodying the various aspects of the invention.

The applications 140 (and more generally, any requesting entity, including the operating system 123) are configured to issue queries against a database 127 (shown in storage 126). The database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data abstraction model 148 of the abstract query interface 146. The abstract queries are executed by a runtime component 150 which transforms the abstract queries into a form consistent with the physical representation of the data contained in the database 127. The application query specification 142 and the abstract query interface 146 are further described with reference to FIG. 2.

In one embodiment, elements of a query are specified by a user through a graphical user interface (GUI). The content of the GUIs may be generated by the application(s) 140. In a particular embodiment, the GUI content is hypertext markup language (HTML) content which may be rendered on the client computer systems 101 with query program 114. For example, the server 102 may respond to requests to access a database 127, which illustratively resides on the server 102. Incoming client requests for data from the database 127 may invoke an application 140. When executed by the processor 121, the application 140 may cause the server 102 to perform the steps or elements embodying the various aspects of the invention, including accessing database 127.

As illustrated in FIG. 1, application 140 may also include an analysis routine 144. Analysis routine 144 may determine the specific query results displayed at a client computer 101. For example, query results may be displayed on a GUI screen associated with query program 114. The GUI screen displaying query results may be configured to receive user input, for example, a selection of a particular data standard for the query results. Query program 114 may invoke analysis routine 144 in response to receiving a selection of a data standard. Analysis routine 144 may determine query results that comport with the selected data standard and cause the comporting query results to be identified in the GUI screen. The GUI screen for displaying query results and the analysis routine 144 are discussed in greater detail below.

Relational View of Environment

Figure 2:
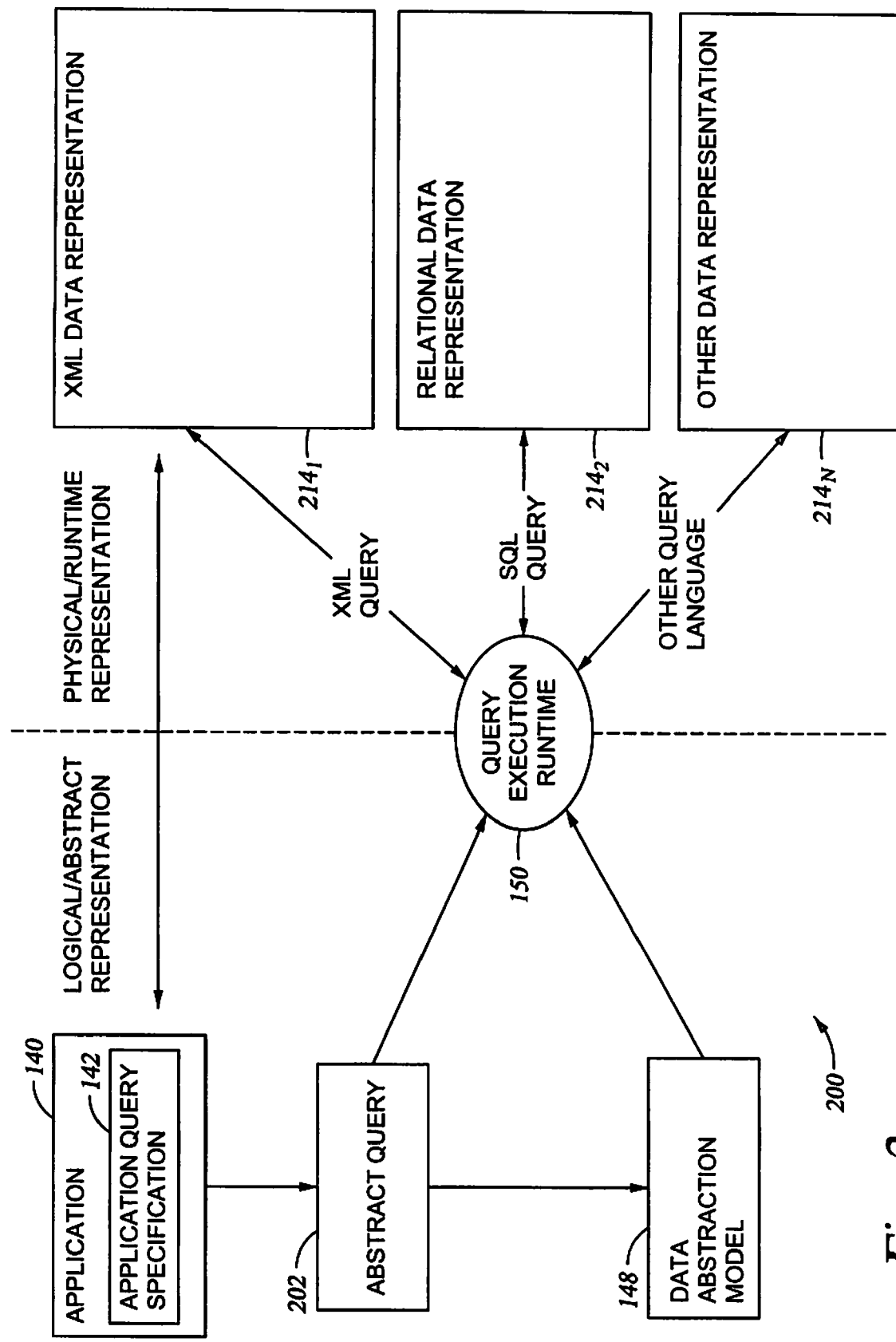
FIG. 2 illustrates a relational view of software components used to create and execute database queries, according to an embodiment of the invention.

FIG. 2 illustrates an exemplary relational view 200 of components according to an embodiment of the invention. A requesting entity, for example, an application 140 may issue a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the database 127. As a result, abstract queries may be defined that are independent of the particular underlying data representation used. In one embodiment, the application query specification 142 may include both criteria used for data selection and an explicit specification of the fields to be returned based on the selection criteria.

The logical fields specified by the application query specification 142 and used to compose the abstract query 202 are defined by the data abstraction model 148. In general, the data abstraction model 148 may expose information as a set of logical fields that may be used within a query (e.g., the abstract query 202) issued by the application 140 to specify criteria for data selection and specify the form of result data returned from a query operation. The logical fields may be defined independently of the underlying data representation being used in the database 127, thereby allowing queries to be formed that are loosely coupled to the underlying data representation.

In one embodiment of the invention, data abstraction model 148 may include a query attribute selection to determine a data standard of data. The data standard may determine a quality of the data. For example, one or more data standards may be defined in the data abstraction model 148 to distinguish data stored in a database based on one or more criteria. Exemplary data standards may include, for example, gold standard, silver standard, no standard, and the like. In one embodiment, gold standard data may be highly desirable data due to, for example, high reliability and accuracy of the data.

For example, gold standard data may represent test data collected in a highly controlled environment and/or using superior equipment, and the like. Therefore, determining whether data is gold may involve determining whether the data falls within a definition of gold data. For example, the definition of gold data may include environmental conditions, equipment types, time of data collection, and the like.

Silver standard data may be less desirable than gold standard data because of, for example, the lack of a controlled test environment during data collection, use of inferior equipment, and the like. Accordingly, silver data may be data that does not qualify a gold data. In some embodiments, silver data may be data that satisfies a definition of silver data. The definition of silver data may include, for example, environmental conditions, test equipment, time of data collection, and the like.

In one embodiment, no standard data may be data for which criteria establishing the data standard are not available. For example, no standard data may be data for which one or more definitional criteria, for example, environmental conditions, test equipment, time of collection, and the like is not available. Alternatively, no standard data may be selected if a particular data standard is not desired. For example, in one embodiment a user may desire to view results irrespective of the data standard. Accordingly, the user may select no-standard as the data standard. While gold standard data, silver standard data, and no standard data are described herein, one skilled in the art will recognize that any number of levels of data standards may be implemented.

Furthermore, any reasonable criteria for establishing data standards may be implemented. In one embodiment, one or more values of particular fields in database 127 may establish the data standard. For example, it may be desirable to consider test data collected in a particular temperature range or using a particular measuring device. Accordingly, the definition of gold standard data in the data abstraction model 148 may include the particular temperature range and/or the particular measuring device. Data falling outside the temperature range and/or data collected with an inferior measuring device may be classified as silver standard data. Data for which the temperature or equipment data is unavailable may be classified as no standard data.

In one embodiment of the invention, the date of data collection may determine the data standard. For example, a hospital may induct new test equipment for data collection on a particular date. The new test equipment may be superior to previously used equipment. Accordingly, data collected after the date of induction of the new test equipment may be classified as gold standard data. Data collected using the previously used equipment may be classified as silver standard data.

FIG. 3 illustrates an exemplary data abstraction 148 model according to an embodiment of the invention. In general, data abstraction model 148 comprises a plurality of field specifications 308. A field specification may be provided for each logical field available for composition of an abstract query. Each field specification may comprise a logical field name 310 and access method 312. For example, the field specification for Field A in FIG. 3 includes a logical field name 310$a$ ('FirstName'), and an associated access method 312$a$ ('simple').

The access methods may associate logical field names 310 to a particular physical data representation 214 (See FIG. 2) in a database 127. By way of illustration, two data representations are shown in FIG. 2, an XML data representation 214$_1$, and a relational data representation 214$_2$. However, the physical data representation 214$_N$ indicates that any other data representation, known or unknown, is contemplated. In one embodiment, a single data abstraction module 148 may contain field specifications with associated access methods for two or more physical data representations 214. In an alternative embodiment, a separate data abstraction module 148 may be provided for each separate data representation 214.

Any number of access methods is contemplated depending upon the number of different types of logical fields to be supported. In one embodiment, access methods for simple fields, filtered fields and composed fields are provided. For example, field specifications for Field A exemplify a simple field access method 312$a$. Simple fields are mapped directly to a particular entity in the underlying physical data representation (e.g., a field mapped to a given database table and column). By way of illustration, the simple field access method 312$a$, shown in FIG. 3 maps the logical field name 310$a$ ('FirstName') to a column named "f_name" in a table named "Test Table," as illustrated.

The field specification for Field X exemplifies a filtered field access method 312$b$. Filtered fields identify an associated physical entity and provide rules used to define a particular subset of items within the physical data representation. For example, the filtered field access method 312b may map the logical field name 310b to a physical entity in a column named "TestVal" in a table named "Test Table" and may define a filter for the test values. For example, in one embodiment, the filter may define a numerical range in which the test values may be deemed valid.

A composed field access method may also be provided to compute a logical field from one or more physical fields using an expression supplied as part of the access method definition. In this way, information which does not exist in the underlying data representation may be computed. For example, a sales tax field may be composed by multiplying a sales price field by a sales tax rate.

It is contemplated that the formats for any given data type (e.g., dates, decimal numbers, etc.) of the underlying data may vary. Accordingly, in one embodiment, the field specifications 308 may include a type attribute which reflects the format of the underlying data. However, in another embodiment, the data format of the field specifications 308 is different from the associated underlying physical data, in which case an access method is responsible for returning data in the proper format assumed by the requesting entity.

Thus, the access method must know what format of data is assumed (i.e., according to the logical field) as well as the actual format of the underlying physical data. The access method may then convert the underlying physical data into the format of the logical field. By way of example, the field specifications 308 of the data abstraction model 148 shown in FIG. 2 are representative of logical fields mapped to data represented in the relational data representation 2142. However, other instances of the data extraction model 148 map logical fields to other physical data representations, such as XML.

A field specification 308 may include one or more standard specifications for identifying a data standard. The standard specifications may map to a standard specification field 309 of data abstraction model 148. For example, in FIG. 3, Field X may include a value standard 320 and/or a date standard 321. Value standard 320 may map to a value standard specification field Y and the date standard 321 may map to a date standard specification field Z.

The standard specification fields 309 may include data standard definitions. Illustratively, value standard field Y may define a data standard based on one or more values in particular fields of database 127. For example, in one embodiment, the data standard may depend on a temperature at which data is collected determined by a temperature field of database 127, as discussed above. Accordingly, standard specification Field Y, may define a first temperature range defining gold standard data, a second temperature range defining silver standard data, and the like, as illustrated in FIG. 3. The temperature ranges establishing the data standard may be defined in the criteria 310 of value standard field Y.

One skilled in the art will recognize that any number and types of criteria may establish a particular data standard. In other words, in some embodiments, the data standard may be established by a plurality of fields of database 127. For example, a particular data standard, for example, the gold standard, may be defined based on temperature, pressure, the type of equipment used, and the like. Furthermore, any type of field, for example, numerical, alphabetical, Boolean, time/date type field may be included in the definition of a particular data standard.

In one embodiment of the invention, a date standard field Z may establish a data standard based on the date of measurement of data. For example, in data standard field Z of FIG. 3, gold standard data is defined as data collected after the year 2000. Silver standard data is defined as data collected between the years 1990 and 2000. Data collected prior to the year 1990 is defined as null or no standard data.

In one embodiment of the invention, the definitions of the date standard field may be associated with the induction of superior equipment for collecting data. For example, a hospital may induct a superior blood pressure monitor in the year 2001. Accordingly, data collected after the year 2000 may be more accurate and more desirable for analysis and research. Therefore data collected after the year 2000 may be defined as gold standard data. Blood pressure data collected prior between 1990 and 2000 may have been collected with older and less desirable equipment. Accordingly, such data may be defined as silver standard data. The nature of equipment used to collect blood pressure data prior to 1990 may not be known. Therefore, such data may be defined as no standard data.

While definition of date standard data based on the induction of new equipment is described herein, one skilled in the art will recognize that any other event or combination of events may establish the data standard based on date. For example, a hospital may induct an improved procedure to collect patient data. The time range of data collection based on a particular procedure may define a particular data standard.

Query Composition Using GUIs

In one embodiment of the invention, creating a query may involve providing a graphical user interface for defining the query. For example, a user may launch a query program 114 in client computer 101 to construct a query. Query program 114 may display a plurality of graphical user interface (GUI) screens to aid the user in constructing a query to retrieve desired data from database 127. The graphical user interface screen may include a combination of text boxes, drop down menus, selection buttons, check boxes, and the like, to create query conditions.

Figure 4:
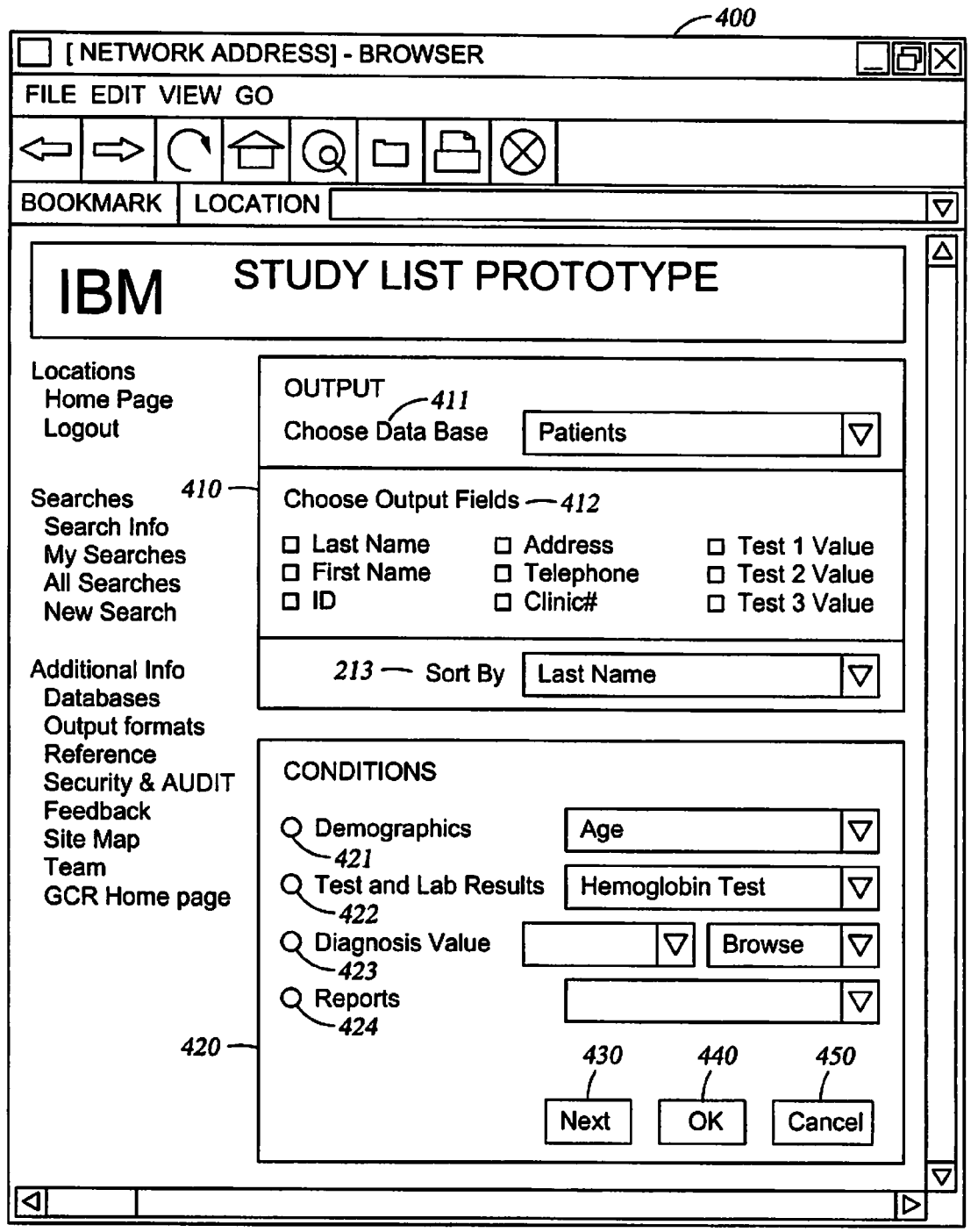
FIG. 4 illustrates an exemplary Graphical User Interface (GUI) screen for composing a query, according to an embodiment of the invention.

FIG. 4 illustrates an exemplary GUI screen 400 for constructing a query. In general, GUI 400 may include a plurality of output categories 410 and a plurality of condition categories 420. Output categories 410 may contain a choice of database 411 to select a database 127, for example, a database containing data for a particular type of persons related to the hospital. A user may choose for example, in a drop down box, the patients' database, doctors' database, staff database, etc.

Output categories 410 may also contain a list of output fields that may define particular data displayed in the results of a query. Output field selection may be performed by clicking check boxes associated with a listed field. For example, in FIG. 4, checkboxes are provided for selecting Last Name, First Name, Identification number (ID), Address, Telephone number, and Clinic number test 1 value, and the like. While check boxes are described herein, one skilled in the art will recognize that any reasonable means for selecting the output fields, such as a drop down boxes, text boxes, etc may be used.

Output categories 410 may contain a sort drop down box to select a reference field for sorting. Output fields 412 may be provided in the dropdown box. In some embodiments the fields reflected in the sort box 413 may be dynamically updated to reflect only those fields selected by the user. For simplicity, FIG. 4 illustrates the selection of only one field for sorting. However, one skilled in the art will recognize that results may be provided using different sorting criteria for multiple fields. Therefore, GUI 400 may include appropriate GUI elements to receive input related to such multiple fields and sorting criteria.

GUI 400 may also contain a plurality of condition categories 420, each category having an associated radio button that the user may select. The condition categories shown include "demographics" 421, "Tests and Lab Results" 422, "Diagnosis" 423 and "Reports" 424. As illustrated, each field has an associated field into which a value may be selected or input. Some fields are drop down menu's while some may be text boxes. In the latter case, the fields may have associated browse buttons to facilitate user selection of valid values.

Figure 5:
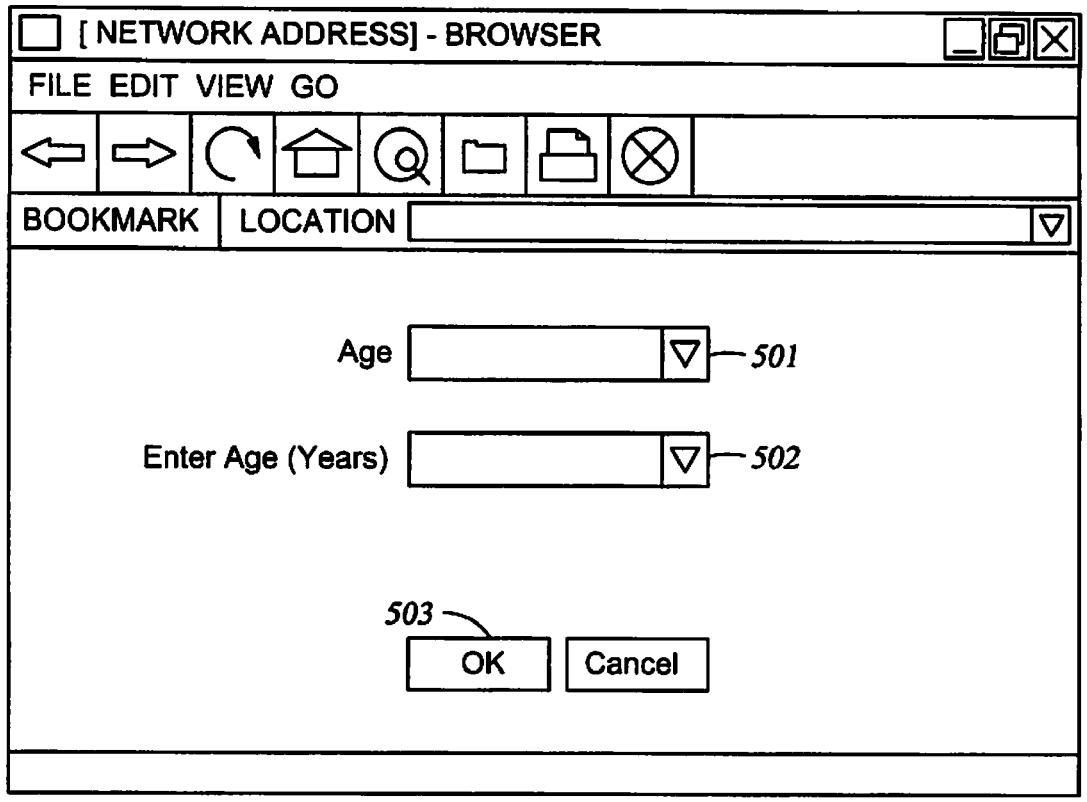
FIG. 5 illustrates another exemplary GUI screen for composing a query, according to an embodiment of the invention.

Once the condition categories and values have been selected, the user may click on the Next button 430. Clicking the Next button 430 may cause the GUI to render the next appropriate interface necessary to continue the process of adding a condition. In this manner, the user may be presented with a series of graphical user interfaces necessary to add a condition. By way of example, assume that the user has selected the demographic condition category 421 and the "Age" value from the drop-down menu. Upon pressing the Next button 430, the user may be presented with a second GUI 500 shown in FIG. 5. GUI 500 may comprise a comparison operator drop-down menu 501 from which a user may select a comparison operator (e.g., >, <, =) and an age field 502 into which a user may input a value for the age. The process of adding the age condition is completed when the user clicks on the OK button 503.

Figure 6:
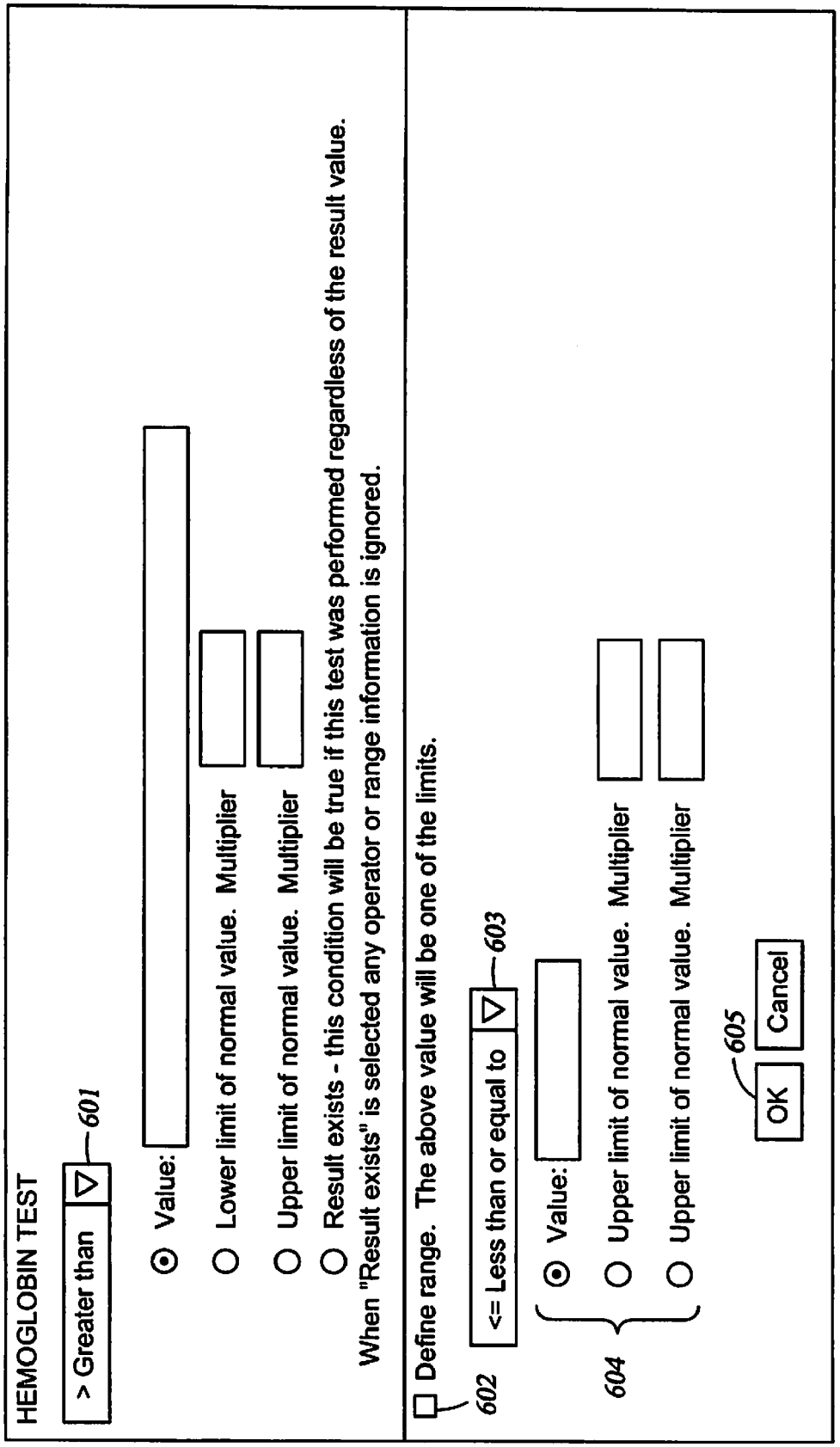
FIG. 6 illustrates yet another exemplary GUI screen for composing a query, according to an embodiment of the invention.

Similarly, if the user had selected Hemoglobin Test in the Tests and Lab Results dropdown 422 GUI 600 in FIG. 6 may be displayed to input desired search criteria for the selected test. The upper portion of the GUI 600 includes a drop-down menu 601 from which to select a comparison operator and a plurality of regular buttons (illustratively for) for defining a value. The user may search on a range of values for the selected test by checking the Range checkbox 602. The user must then specifying a comparison operator from the drop-down menu 603 and an associated value by selecting one of the radio buttons is 604. Once the search criteria for GUI 600 have been entered the user may press the OK button 605.

Shown below is an exemplary query that may be constructed using the GUI screens 400, 500, and 600:
SELECT "Patient ID", "Last Name", "Test1"
FROM TABLE PATIENTS
WHERE
Age>50 AND HemoglobinTest>30

The SELECT clause of the query may identify the results displayed when the query is run. For example, in the exemplary query above, the patient ID, patients' last name, and Test1 value may be displayed in the results of the query. The contents of the SELECT clause may be determined by user selection of output fields 412 in GUI screen 400.

The FROM clause of the exemplary query may determine the particular database from which results are retrieved. For example, the results are derived from the Patients database in the exemplary query above. The database from which the results are derived may be determined by user selection of the database 411 in GUI screen 400.

The WHERE clause of the exemplary query establishes query conditions. For example, the Age>50 condition may be defined by a user using GUI screen 500 and the Hemoglobin Test>30 condition may be defined by the user using GUI screen 600.

In one embodiment of the invention, the exemplary query described above may be an abstract query. Accordingly, each field of the exemplary query, for example, patient ID, last name, test 1, age, hemoglobin test, and the like, may have an associated field specification 308 (see FIG. 3) in data abstraction model 248. The abstract query may be executed by the runtime component 150 which transforms the abstract queries into a form consistent with the physical representation of the data contained in the database 127 based on data abstraction model 148.

Displaying Standardized Query Results

In one embodiment of the invention, run time component 150 may return the results of a query along with data required to determine a data standard for the query results to an application 140. For example, an abstract query processed by run time component 150 may reference a field X (see FIG. 3). In response to determining that field X includes a value standard 320 and/or date standard 321, run time component 150 may return data from one or more fields associated with determining a data standard along with one or more conditions for determining the data standard to application 140.

For example, in FIG. 3, field X includes a value standard 320 and date standard 321. Date standard 321 refers to a date standard specification field Z. Accordingly, run time component 150 may return the conditions associated with determining the data standard in field Z along with the date of data collection for each query result. Similarly, value standard 320 refers to a value standard specification field Y. Therefore, run time component 150 may return the data standard determination criteria 310 along with any data that may be required for determining the data standard based on the criteria. For example, criteria 310 may include a reference to a temperature field. Accordingly, run time component may return one or more values in a temperature field associated with each query result to application 140.

Application 140 may be configured to cause query results to be displayed in a GUI screen at a client computer 101. For example, query program 114 may generate a GUI screen and display query results in the GUI screen according to input received from an application 140. FIG. 7 illustrates an exemplary GUI screen 700 displaying results for the exemplary query described above. As illustrated in FIG. 7, GUI 700 includes at least one or more fields requested to be displayed by the exemplary query. For example, GUI 700 may display a patient ID column 710, last name column 720, and a test 1 column 750 associated with fields identified in the SELECT clause of the exemplary query.

In one embodiment, GUI 700 may display one or more additional fields associated with the results of the query, for example, first names included in column 730. In some embodiments, the additional fields may be associated with one or more conditions of the exemplary query. For example, age column 740 and hemoglobin test column 760 may be displayed as a result of the age and hemoglobin conditions identified in the WHERE clause of the exemplary query.

In one embodiment of the invention, one or more fields associated with determining a data standard may be displayed in GUI screen 700. For example, a query may refer to a field, for example, specification field X of FIG. 3. Field X may include a date standard 321. Accordingly, a date column 770 may be included in GUI 700 to display a date associated with each query result. Similarly, if field X includes a value standard 320, one or more fields associated with criteria 310 in a value standard specification field Y may be included as a column in GUI screen 700.

In one embodiment of the invention, application 140 may be configured to initially display all results associated with a query at a client computer 700. For example, GUI screen 700 displays all results for the exemplary query described above.

GUI screen 700 may include a data standard selection tool 710 to facilitate selection of a data standard for the query results. Upon receiving a selection of a data standard, the query results displayed in GUI screen 700 may be modified to reflect only those query results that comport with the selected data standard.

Data standard selection tool 710 in FIG. 7 is shown as a collection of radio buttons and checkboxes. For example, radio buttons 701 and 702 may be provided to select a value standard or a date standard, as illustrated. If the value standard radio button 701 is selected, the user may be allowed to enter the desired value based data standard. For example, check boxes 703-704 are provided to facilitate user selection of a value based data standard. On the other hand, if the date standard radio button 702 is selected, the user may be allowed to select check boxes 706-708 to select the appropriate date based data standard.

While radio buttons and check boxes are disclosed herein, one skilled in the art will recognize that embodiments of the invention are not limited to the particular implementation in GUI 700. More generally, any reasonable combination of text areas, drop down boxes, buttons, and the like may be implemented to facilitate user selection of a desired data standard. In some embodiment, the user may be allowed to select a plurality of data standards. For example, a user may select check boxes for gold and silver data standards. Accordingly, data meeting the definition of gold standard data and data meeting the definition of silver standard data may be displayed in the results of the query.

In a particular embodiment of the invention, data standard selection tool 710 may be a slider tool. The slider tool may provide a slider bar configured to slide along a spectrum of data standards displayed in GUI screen 700. The position of the slider bar relative to the displayed data standards may determine the results displayed in GUI screen 700.

The selection of a data standard in GUI screen 700 may be transmitted to an analysis routine 144 of an application 140. Analysis routine 144 may be configured to determine the specific query results that comport with the selected data standard. For example, analysis routine 144 may use the conditions for determining the data standard and the data necessary for determining the data standard received from run time component 150 to determine whether a particular query result meets the selected data standard.

For example, a user may select radio button 701 in GUI screen 700 to identify a date based data standard. Subsequently, the user may select checkbox 703 to indicate a desire to view gold standard data. The user selection of the data standard may be transmitted to analysis routine 144. As discussed earlier, during query execution, application 140 may receive the data and conditions necessary for determining a data standard for each query result. For example, application 140 may receive the conditions for determining the date standard illustrated in field Z of FIG. 3 and a date value for each query result, illustrated in column 770 of FIG. 7.

Analysis routine may determine the specific query results that are in accordance with the selected date standard using the data and conditions necessary for determining the data standard provided by the run time component. The specific query results may be transmitted to query program 114 at client computer 101. Accordingly, query program 114 may be configured to modify results displayed in GUI screen 700 such that only results in accordance with the selected data standard are displayed.

Referring back to FIG. 3, date based gold standard data may be defined as data collected after the year 2000. Accordingly, user selection of date based gold standard may cause only those results for which the date in date column 770 is after the year 2000. FIG. 8 illustrates an exemplary GUI screen 800 displaying gold standard data for the exemplary query. As illustrated in FIG. 8, only those query results that meet the date based gold standard, i.e. query results for dates later than the year 2000, are displayed.

In one embodiment of the invention, query results that are not in accordance with the selected data standard are hidden, thereby displaying only the query results that are in accordance with the selected data standard. However, any reasonable means for visually identifying data in accordance with the selected data standard, for example, different colored highlighting, may also be used.

In one embodiment of the invention, data standard selection tool 710 may also include one or more tools for further narrowing a set of results. For example, data standard selection tool may include a tool for narrowing results based on data in one or more fields, for example, age column 740, displayed in GUI 700. Accordingly, data standard selection tool may include, for example, a tool for identifying an age range for the query results, to further narrow the results.

In one embodiment of the invention, each field displayed in GUI 700 may have an associated data standard. Furthermore, it may be desirable to select a different data standard for each respective of the respective fields. For example, a researcher may desire to select gold standard data for a field that is most significant to research and apply a lesser standard to a field that is not as significant to the research. Accordingly, data standard selection tool 710 may allow selection of a data standard for each field for which a data standard may be defined.

Figure 9:
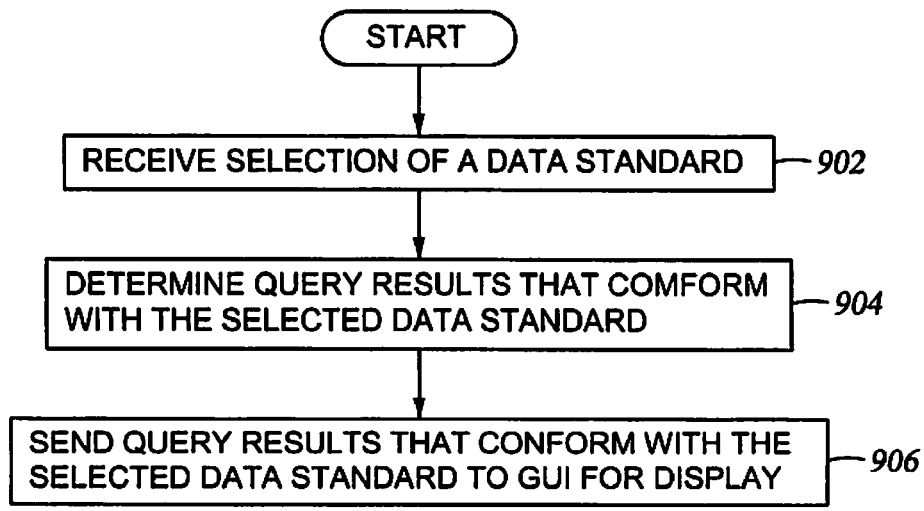
FIG. 9 is a flow diagram of exemplary operations performed to display query results that comport with a selected data standard.

FIG. 9 is a flow diagram of exemplary operations that may be performed by an analysis routine 144 to display query results according to a selected data standard. The operations may begin in step 902 by receiving a selection of a data standard. In step 904, analysis routine 144 may determine the specific query results that comport with the selected data standard. For example, the analysis routine may determine whether a query result meets the data standard based on the data and conditions for determining the data standard received from run time component 150 during execution of the query. In step 906, the specific results of the query that comport with the selected data standard may be displayed on a GUI screen. For example, the query results that do not comport with the selected data standard may be hidden, thereby displaying the results that are in accordance with the selected data standard.

CONCLUSION

By allowing abstraction of data standards and providing a selection to define a data standard that may be applied to query results, embodiments of the invention allow a more efficient retrieval of desired data from a database. Furthermore, tedious manual data cleansing of query results is obviated by limiting the results of the query to data that comports with a specified data standard.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   providing a data abstraction model for a database storing a plurality of data records, the data abstraction model defining a plurality of logical fields each uniquely identifiable via a respective logical field name, wherein each of the plurality of logical fields maps to at least one associated target field, each target field comprising at least one of a physical field of the database and a logical field of the data abstraction model, wherein at least one logical field of the plurality of logical fields specifies an access method for retrieving data records accessed for the at least one logical field;

wherein a first logical field of the plurality of logical fields specifies a first data standard characterizing quality of data records accessed via the at least one target field associated with the first logical field;

wherein the first data standard is represented as a second logical field of the data abstraction model, wherein the second logical field specifies: (i) a data standard name uniquely identifying the first data standard and (ii) a plurality of associated quality levels, each quality level representing a distinct measure of data quality under the first data standard, each quality level uniquely identifiable via a respective level name and having respective level criteria for determining whether an accessed data record conforms to the respective quality level under the first data standard, the level criteria being expressed in terms of one or more fields;

receiving an abstract query composed on the basis of the data abstraction model, wherein the abstract query specifies at least one logical field and a desired level under the first data standard, wherein the abstract query does not specify any physical field of the database and does not specify any level criteria;

by operation of one or more computer processors, generating a concrete query from the abstract query based on the data abstraction model, wherein the concrete query specifies at least one physical field of the database and does not specify any logical field, and wherein the concrete query is executed against the database to retrieve a first set of query results; and outputting at least one data record in the first set of query results for display in a graphical user interface (GUI) screen, responsive to the abstract query, wherein at least one data record not satisfying the desired level under the first data standard is not output in the GUI screen.

2. The method of claim 1, wherein the GUI screen comprises a data quality level selection tool configured to display the plurality of quality levels associated with the first data standard and receive selection of the desired level under the first data standard.

3. The method of claim 2, wherein the first logical field further specifies a second data standard characterizing quality of data records accessed via the at least one target field associated with the first logical field, wherein the second data standard is represented as a third logical field of the data abstraction model;

wherein the third logical field specifies: (i) a data standard name uniquely identifying the second data standard and (ii) a plurality of associated quality levels, each quality level representing a distinct measure of data quality under the second data standard, each quality level uniquely identifiable via a respective level name and having respective level criteria for determining whether an accessed data record conforms to the respective quality level under the second data standard, the level criteria being expressed in terms of one or more fields;

wherein the abstract query further specifies a desired level under the second data standard.

4. The method of claim 3, wherein the at least one data record not satisfying the desired level under the first data standard is filtered out by at least one of the concrete query and an analysis routine configured to, based on the first data standard, suppress one or more data records in the first set of query results from being output for display, and wherein the method further comprises:

subsequent to outputting the first set of query results for display in the GUI screen, receiving user input specifying a different desired level under at least one of the first data standard and the second data standard;

by the analysis routine, generating a second set of query results based on the different desired level and at least one of: (i) the first set of query results; (ii) the abstract query; and (iii) the concrete query; and responsive to the received user input specifying the different desired level, outputting at least one data record in the second set of query results for display in the GUI screen, wherein at least one data record not satisfying the different desired level is not output.

5. The method of claim 4, wherein the one or more fields of the level criteria of the desired level under the first data standard comprises a data record timestamp field, wherein the one or more fields of the level criteria of the desired level under the second data standard comprises a field other than the data record timestamp field, wherein the access method is selected from at least two different access method types, and wherein the one or more fields of the level criteria of each quality level under the first data standard comprises at least one of a physical field and a logical field.

6. A computer program product, comprising: a non-transitory computer-readable storage medium having computer-readable program code embodied therewith, the computer-readable program code comprising: computer-readable program code configured to provide a data abstraction model for a database storing a plurality of data records, the data abstraction model defining a plurality of logical fields each uniquely identifiable via a respective logical field name, wherein each of the plurality of logical fields maps to at least one associated target field, each target field comprising at least one of a physical field of the database and a logical field of the data abstraction model, wherein at least one of the plurality of logical fields specifies an access method selected from at least two access method types;

wherein a first logical field of the plurality of logical fields specifies a first data standard characterizing quality of data records accessed via the at least one target field associated with the first logical field;

wherein the first data standard is represented as a second logical field of the data abstraction model, wherein the second logical field specifies: (i) a data standard name uniquely identifying the first data standard and (ii) a plurality of associated quality levels, each quality level representing a distinct measure of data quality under the first data standard, each quality level uniquely identifiable via a respective level name and having respective level criteria for determining whether an accessed data record conforms to the respective quality level under the first data standard, the level criteria being expressed in terms of one or more fields;

computer-readable program code configured to receive an abstract query composed on the basis of the data abstraction model, wherein the abstract query specifies at least one logical field and a desired level under the first data standard, wherein the abstract query does not specify any physical field of the database and does not specify any level criteria;

computer-readable program code configured to, when executed by one or more computer processors, generate a concrete query from the abstract query based on the data abstraction model, wherein the concrete query specifies at least one physical field of the database and does not specify any logical field, and wherein the concrete query is executed against the database to retrieve a first set of query results; and computer-readable program code configured to output at least one data record in the first set of query results for display in a graphical user interface (GUI) screen, responsive to the abstract query, wherein at least one data record not satisfying the desired level under the first data standard is not output in the GUI screen.

7. The computer program product of claim 6, wherein the GUI screen comprises a data quality level selection tool configured to display the plurality of quality levels associated with the first data standard and receive selection of the desired level under the first data standard.

8. The computer program product of claim 7, wherein the first logical field further specifies a second data standard characterizing quality of data records accessed via the at least one target field associated with the first logical field, wherein the second data standard is represented as a third logical field of the data abstraction model;

wherein the third logical field specifies: (i) a data standard name uniquely identifying the second data standard and (ii) a plurality of associated quality levels, each quality level representing a distinct measure of data quality under the second data standard, each quality level uniquely identifiable via a respective level name and having respective level criteria for determining whether an accessed data record conforms to the respective quality level under the second data standard, the level criteria being expressed in terms of one or more fields;

wherein the abstract query further specifies a desired level under the second data standard.

9. The computer program product of claim 8, wherein the at least one data record not satisfying the desired level under the first data standard is filtered out by at least one of the concrete query and an analysis routine configured to, based on the first data standard, suppress one or more data records in the first set of query results from being output for display, and wherein the computer readable program code further comprises:

computer readable program code configured to, subsequent to the first set of query results being output for display in the GUI screen, receive user input specifying a different desired level under at least one of the first data standard and the second data standard;

computer readable program code of an analysis routine, configured to generate a second set of query results based on the different desired level and at least one of: (i) the first set of query results;(ii) the abstract query; and (iii) the concrete query; and computer readable program code configured to, responsive to the received user input specifying the different desired level, output at least one data record in the second set of query results for display in the GUI screen, wherein at least one data record not satisfying the different desired level is not output.

10. The computer program product of claim 9, wherein the one or more fields of the level criteria of the desired level under the first data standard comprises a data record timestamp field, wherein the one or more fields of the level criteria of the desired level under the second data standard comprises a field other than the data record timestamp field, wherein the access method is selected from at least two different access method types, and wherein the one or more fields of the level criteria of each quality level under the first data standard comprises at least one of a physical field and a logical field.

11. A system comprising:
one or more computer processors; and
a memory containing a program which, when executed by the one or more computer processors, is configured to perform an operation comprising:

providing a data abstraction model for a database storing a plurality of data records, the data abstraction model defining a plurality of logical fields each uniquely identifiable via a respective logical field name, wherein each of the plurality of logical fields maps to at least one associated target field, each target field comprising at least one of a physical field of the database and a logical field of the data abstraction model, wherein at least one of the plurality of logical fields specifies an access method selected from at least two access method types;

wherein a first logical field of the plurality of logical fields specifies a first data standard characterizing quality of data records accessed via the at least one target field associated with the first logical field;

wherein the first data standard is represented as a second logical field of the data abstraction model, wherein the second logical field specifies: (i) a data standard name uniquely identifying the first data standard and (ii) a plurality of associated quality levels, each quality level representing a distinct measure of data quality under the first data standard, each quality level uniquely identifiable via a respective level name and having respective level criteria for determining whether an accessed data record conforms to the respective quality level under the first data standard, the level criteria being expressed in terms of one or more fields;

receiving an abstract query composed on the basis of the data abstraction model, wherein the abstract query specifies at least one logical field and a desired level under the first data standard, wherein the abstract query does not specify any physical field of the database and does not specify any level criteria;

generating a concrete query from the abstract query based on the data abstraction model, wherein the concrete query specifies at least one physical field of the database and does not specify any logical field, and wherein the concrete query is executed against the database to retrieve a first set of query results; and outputting at least one data record in the first set of query results for display in a graphical user interface (GUI) screen, responsive to the abstract query, wherein at least one data record not satisfying the desired level under the first data standard is not output in the GUI screen.

12. The system of claim 11, wherein the GUI screen comprises a data quality level selection tool configured to display the plurality of quality levels associated with the first data standard and receive selection of the desired level under the first data standard;

wherein the first logical field further specifies a second data standard characterizing quality of data records accessed via the at least one target field associated with the first logical field, wherein the second data standard is represented as a third logical field of the data abstraction model;

wherein the third logical field specifies: (i) a data standard name uniquely identifying the second data standard and (ii) a plurality of associated quality levels, each quality level representing a distinct measure of data quality under the second data standard, each quality level uniquely identifiable via a respective level name and having respective level criteria for determining whether an accessed data record conforms to the respective quality level under the second data standard, the level criteria being expressed in terms of one or more fields;

wherein the abstract query further specifies a desired level under the second data standard.

13. The system of claim 12, wherein the at least one data record not satisfying the desired level under the first data standard is filtered out by at least one of the concrete query and an analysis routine configured to, based on the first data standard, suppress one or more data records in the first set of query results from being output for display, and wherein the operation further comprises:

subsequent to outputting the first set of query results for display in the GUI screen, receiving user input specifying a different desired level under at least one of the first data standard and the second data standard;

by the analysis routine, generating a second set of query results based on the different desired level and at least one of: (i) the first set of query results;(ii) the abstract query; and (iii) the concrete query; and responsive to the received user input specifying the different desired level, outputting at least one data record in the second set of query results for display in the GUI screen, wherein at least one data record not satisfying the different desired level is not output.

14. The system of claim 13, wherein the one or more fields of the level criteria of the desired level under the first data standard comprises a data record timestamp field, wherein the one or more fields of the level criteria of the desired level under the second data standard comprises a field other than the data record timestamp field, wherein the access method is selected from at least two different access method types, and wherein the one or more fields of the level criteria of each quality level under the first data standard comprises at least one of a physical field and a logical field.

* * * * *